United States Patent
Miyake et al.

(10) Patent No.: US 6,342,575 B1
(45) Date of Patent: Jan. 29, 2002

(54) ROOM TEMPERATURE CURABLE ORGANOPOLYSILOXANE COMPOSITION AND MAKING METHOD

(75) Inventors: Masatoshi Miyake; Masaya Arakawa, both of Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/641,752

(22) Filed: Aug. 21, 2000

(30) Foreign Application Priority Data

Aug. 25, 1999 (JP) ............................... 11-238209

(51) Int. Cl.[7] .............................................. C08G 77/16
(52) U.S. Cl. ..................... 528/34; 556/459; 556/442; 528/17; 528/18; 528/29; 528/34; 528/901
(58) Field of Search .................................. 556/459, 442; 528/17, 18, 29, 34, 901

(56) References Cited

U.S. PATENT DOCUMENTS 5,217,651 A * 6/1993 Nogaoka

* cited by examiner

*Primary Examiner*—Robert Dawson
*Assistant Examiner*—Kuo-Liang Peng

(57) ABSTRACT

A room temperature curable organopolysiloxane composition comprising (1) a hydroxyl end-blocked organopolysiloxane having a viscosity of 10–1,000,000 centistokes at 25° C. in admixture with a premix of (2) methyltriacetoxysilane or a partial hydrolyzate thereof as a curing agent and (3) methanol is improved in shelf stability, physical properties and outer appearance as well as adhesion to aluminum.

7 Claims, No Drawings

ROOM TEMPERATURE CURABLE ORGANOPOLYSILOXANE COMPOSITION AND MAKING METHOD

This invention relates to an acetic acid removal type room temperature curable organopolysiloxane composition which remains stable during shelf storage and readily cures in the presence of air-borne moisture into a rubbery elastomer having improved heat resistance and adhesion during water immersion, and a method for preparing the same.

BACKGROUND OF THE INVENTION

In the prior art, acetic acid removal type room temperature curable organopolysiloxane compositions which readily cure with moisture into rubbery elastomers are used in a wide variety of applications including adhesives, coating materials, electrical insulating seals, and building sealants. In the preparation of such compositions, methyltriacetoxysilane is often used as the curing agent. Methyltriacetoxysilane, however, has a problem that it must be admitted into a drying oven prior to use because its melting point is about 30° C. Another problem is that in winter, the once melted curing agent crystallizes again upon metering.

To avoid crystallization, use is often made of modified products of methyltriacetoxysilane whose methyl group is replaced by another group such as ethyltriacetoxysilane, propyltriacetoxysilane and vinyltriacetoxysilane. The dimer and trimer of methyltriacetoxysilane are also used.

However, the use of curing agents other than methyltriacetoxysilane can exacerbate adhesion and cause discoloration upon heating. The dimer and trimer of methyltriacetoxysilane are described in U.S. Pat. No. 4,116,935. The product is undesirable in quality because the ratio of monomer/dimer/trimer often varies from lot to lot. U.S. Pat. Nos. 3,886,118 and 4,672,004 disclose to add methoxysilanes or higher alcohols of at least 6 carbon atoms to methyltriacetoxysilane. The addition of such methoxysilanes or higher alcohols is effective for preventing crystallization, but can exacerbate the adhesion to metallic aluminum. Since methyltriacetoxysilane alone fails to improve the adhesion to metallic aluminum, adhesion improvements are made by using as the adhesion promoter di-t-butoxydiacetoxysilane as disclosed in U.S. Pat. No. 4,296,228 or aminosilanes as disclosed in U.S. Pat. No. 4,220,748, which leads to an increased cost.

SUMMARY OF THE INVENTION

An object of the invention is to provide an inexpensive, room temperature curable organopolysiloxane composition which has eliminated the crystallization problem of methyltriacetoxysilane used as the curing agent and firmly adheres to metallic aluminum.

The invention pertains to an acetic acid removal type room temperature curable organopolysiloxane composition comprising a both end hydroxyl group-blocked organopolysiloxane having a viscosity of about 10 to 1,000,000 centistokes at 25° C. and methyltriacetoxysilane or a partial hydrolyzate thereof as a curing agent. It has been found that adding a selected amount of methanol to methyltriacetoxysilane or a partial hydrolyzate thereof, and especially adding a premix of methyltriacetoxysilane or its partial hydrolyzate and methanol to the organopolysiloxane is effective for improving the adhesion of the composition to metallic aluminum and also for preventing the crystallization of methyltriacetoxysilane or its partial hydrolyzate which becomes a problem during manufacture. Additionally, the resulting composition has satisfactory physical properties and is inexpensive.

The invention provides a room temperature curable organopolysiloxane composition comprising (1) 100 parts by weight of an organopolysiloxane of the following general formula (I):

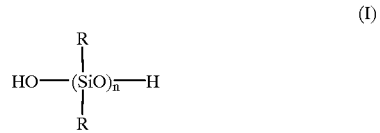

wherein R is a monovalent hydrocarbon group, and n is such an integer that the organopolysiloxane may have a viscosity of about 10 to 1,000,000 centistokes at 25° C., (2) 2 to 10 parts by weight of methyltriacetoxysilane or a partial hydrolyzate thereof, and (3) 0.01 to 0.5 part by weight of methanol per part by weight of component (2).

In another aspect, the invention provides a method for preparing the room temperature curable organopolysiloxane composition, comprising the steps of premixing components (2) and (3), and mixing the premix with component (1).

DESCRIPTION OF THE PREFERRED EMBODIMENT

The base polymer in the room temperature curable organopolysiloxane composition of the invention is an organopolysiloxane of the general formula (I):

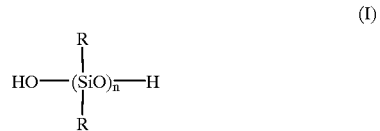

wherein R is a monovalent hydrocarbon group, and n is such an integer that the organopolysiloxane may have a viscosity of about 10 to 1,000,000 centistokes at 25° C. The R groups may be the same or different.

In formula (I), R stands for substituted or unsubstituted monovalent hydrocarbon groups, preferably having 1 to 10 carbon atoms, more preferably 1 to 8 carbon atoms. Examples include alkyl groups such as methyl, ethyl, propyl, butyl and hexyl, aryl groups such as phenyl and tolyl, alkenyl groups such as vinyl, allyl and butenyl, aralkyl groups such as benzyl and 2-phenylethyl, and substituted ones of these groups in which some or all of the hydrogen atoms attached to carbon atoms are replaced by halogen atoms or cyano groups, such as chloromethyl, trifluoropropyl and cyanoethyl. Of these, methyl, phenyl, vinyl and trifluoropropyl are preferred.

Letter n which corresponds to a degree of polymerization is such an integer that the organopolysiloxane may have a viscosity of about 10 to 1,000,000 centistokes (cs) at 25° C. and especially about 500 to 100,000 cs at 25° C. from the working standpoint.

Illustrative examples of the organopolysiloxane of formula (I) are given below.

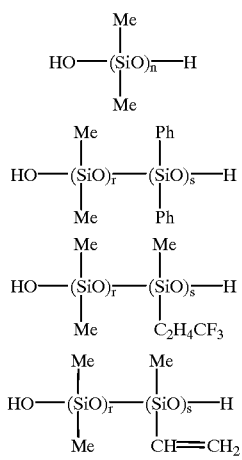

In the formulae, Me is methyl, Ph is phenyl, r and s are positive integers, and r+s is equal to the integer of n which is as defined above. Of these, the compounds of formula (Ia) are preferred.

Apart from the above-described structure, the polymer may be blocked at one end with 0 to 10 mol % of trimethylsilyl groups. Alternatively, the polymer may have introduced in its structure a branched structure of the following formula in an amount of 0 to 3 mol % based on the molecular weight.

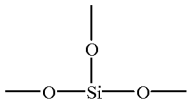

The second component in the inventive composition is methyltriacetoxysilane of the following formula (II) or a partial hydrolyzate thereof.

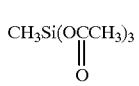

An appropriate amount of methyltriacetoxysilane or its partial hydrolyzate (2) blended is about 2 to 10 parts, and preferably about 3 to 6 parts by weight per 100 parts by weight of the organopolysiloxane (1). A composition containing less than 2 parts of methyltriacetoxysilane becomes short curable and unstable during storage. With more than 10 parts of methyltriacetoxysilane, the cured composition becomes hard and brittle and fails to perform well as a sealant, and the cost is increased.

The third component (3) is methanol. Methanol is blended in an amount of 0.01 to 0.5 part, and preferably 0.03 to 0.3 part by weight per part by weight of methyltriacetoxysilane or its partial hydrolyzate (2). A less amount of methanol is insufficient to prevent the crystallization of methyltriacetoxysilane and improve the adhesion to metallic aluminum whereas a larger amount of methanol causes the composition to thicken or gel.

In the inventive composition, an inorganic filler may be blended as a fourth component. Useful inorganic fillers include silica, carbon black, titanium oxide, calcium carbonate, colloidal calcium carbonate, clay and talc, which are surface treated if desired. These reinforcing fillers may be used alone or in a combination of two or more since a suitable combination of such fillers can impart satisfactory durability to the composition. When used alone, the preferred fillers are silica, carbon black, and colloidal calcium carbonate. When the fillers are used in admixture, suitable combinations include a combination of silica with colloidal calcium carbonate, a combination of silica with carbon black, and a combination of colloidal calcium carbonate with carbon black.

More specifically, the preferred filler used alone is silica. Dry silica which has been hydrophobicized by surface treatment with suitable agents such as silanes, siloxanes and silazanes is especially preferable since its zero water content allows the amount of the curing agent to be reduced, leading to improved storage stability and physical properties. It is also preferred to blend colloidal calcium carbonate which has been fully surface treated with an agent having a melting or softening point of at least 100° C., or calcined clay which may or may not have been surface treated.

Of the calcium carbonate species, colloidal calcium carbonate, especially one prepared by a dry method, is advantageously used. Colloidal calcium carbonate should preferably have a lower water content, and especially up to 0.5% by weight. More preferably the water content of colloidal calcium carbonate is reduced to 0.3% by weight or lower by heat treatment or electromagnetic treatment prior to use. Calcium carbonate preferably has a mean particle size (primary particle) of 0.01 to 0.2 μm, and especially 0.01 to 0.1 μm. Calcium carbonate powder with a mean (primary) particle size of more than 0.2 μm may adversely affect the mechanical strength of the silicone rubber loaded therewith.

It is preferred to treat calcium carbonate on the surface with an agent having a melting or softening point of at least 100° C., and especially 150 to 400° C., because improvements in heat resistance and adhesion in hot water are expectable. Suitable treating agents having a melting or softening point of at least 100° C. include rosin, disproportioned rosin, silicone resins, and saturated or unsaturated fatty acids represented by $C_mH_{2m+1}COOH$ wherein m is an integer of at least 20. The rosin is generally divided into abietic, pimaric, isopimaric, and labdanum types, which are all useful herein. There are present approximately five to ten isomers including abietic acid, neoabietic acid, parastric acid, dehydroabetic acid, pimaric acid, isopimaric acid, sandaracopimaric acid, comuric acid, dextropimaric acid and levopimaric acid. As the treating agent used herein, a rosin product containing about one to three isomers wherein the isomer having the highest content has a purity of at least 60% is best suited. Where a higher function is desirable, saturated fatty acids having a melting or softening point of at least 100° C. are preferred for coloring and other reasons. It is also preferred to treat calcium carbonate with dihydroabietic acid, diabietic acid, tetraabietic acid, pimaric acid, isopimaric acid, and sandaracopimaric acid. The treating agent is used in a sufficient amount to treat active surfaces of calcium carbonate particles, preferably about 1 to 10% by weight, and more preferably about 2 to 5% by weight based on the weight of calcium carbonate. Less than 1% by weight of the treating agent would fail to cover the entire surfaces of calcium carbonate particles. Treatment of calcium carbonate with such an agent may be carried out in a conventional way.

Calcined clay may be any of commercial products, though not limited thereto, for example, Tycin, Opti-White MX, Opti-White P and 30P which are special calcined clay by Parges, KE 2211, 5178 and CB which are calcined clay treated with silane coupling agents or fatty acids, Icecap K and Iceburg No. 30 which are untreated calcined clay. Also preferably, these calcined clay products are surface treated with the same treating agents as used for the calcium carbonate.

The amount of the inorganic filler blended may be suitably determined although it is preferred to use about 5 to 150 parts, and especially about 5 to 100 parts by weight of the inorganic filler per 100 parts by weight of the organopolysiloxane (1).

In the inventive composition, a condensation catalyst is preferably used in order to promote the cure thereof. Useful condensation catalysts include organic tin compounds such as dibutyltin dimethoxide, dibutyltin diacetate, dibutyltin dioctate, dibutyltin dilaurate, dimethyltin dimethoxide, and dimethyltin acetate; organic titanium compounds such as tetrapropyl titanate, tetrabutyl titanate, tetra-2-ethylhexyl titanate, and dimethoxytitanium diacetylacetonate; organic zirconium compounds such as tetrapropoxyzirconium, tetrabutoxyzirconium, and dipropoxydiacetylacetonate; amine compounds such as hexylamine, 3-aminopropyltrimethoxysilane, and tetramethylguanidylpropyltrimethoxysilane, and salts thereof; and guanidine compounds. These catalysts may be used alone or in admixture.

An appropriate amount of the condensation catalyst used is usually up to 10 parts, preferably 0 to 5 parts, and more preferably 0.001 to 2 parts by weight per 100 parts by weight of the organopolysiloxane (1). Use of more than 10 parts of the condensation catalyst rather worsens the cured properties of the composition as typified by a shorter initial tack-free time, shelf instability, and poor fatigue endurance, aggravating the sealant performance.

As to the timing when the condensation catalyst is added, preferably the catalyst is previously added to the organopolysiloxane (1) prior to the addition of components (2) and (3), because this order gives the surface of the final product a better appearance.

Where more efficient working is desirable, a flow or sag control agent, known as a thixotropic agent, is preferably added to the inventive composition. The amount of the sag control agent added is preferably about 0.01 to 10 parts, and more preferably about 0.1 to 0.5 parts by weight per 100 parts by weight of the organopolysiloxane (1). Useful sag control agents include polyethers as typified by polyethylene oxide and polypropylene oxide, and polyethers modified with siloxanes.

Further preferably, an aminosilane, epoxysilane or di-t-butoxydiacetoxysilane is added as an adhesion promoter for further improving the performance of the composition. An appropriate addition amount is about 0.1 to 5 parts by weight per 100 parts by weight of the organopolysiloxane (1).

In the inventive composition, there may be blended various additives other than the above-mentioned components, for example, pigments, dyes, anti-rusting agents, flame retardants, mildew-proof agents, scavengers, extrusion modifiers (e.g., low-viscosity fluids, glass balloons, and non-silicone fluids, typically iso-paraffin), and antioxidants. These optional components may be added in conventional amounts that do not impede the objects of the invention.

From the manufacture standpoint, it is preferable to add a silicone fluid such as trimethylsilyl end-blocked dimethylpolysiloxane having a low viscosity (typically of 0.1 to 10,000 centipoise at 25° C.) as the extrusion modifier and wetter because the composition is further improved in elongation and durability. Such a silicone fluid is preferably added in an amount of 0 to about 100 parts by weight per 100 parts by weight of the organopolysiloxane (1). Unless such silicone fluid is added, the composition is adhesive, but is sometimes poor in workability (in terms of extrusion and elongation). It is thus recommended to add a suitable amount of silicone fluid. However, since large amounts of silicone fluid can adversely affect adhesion and cause joint staining, it is preferred to add about 1 to 50 parts of silicone fluid.

The organopolysiloxane composition of the invention is prepared by mixing the above-described components. Better results are obtained by premixing the methyltriacetoxysilane or its partial hydrolyzate (2) with the methanol (3) and blending the premix with the organopolysiloxane (1). When the curing catalyst is to be added, it is preferred to previously mix the catalyst with the organopolysiloxane (1) as described above.

According to the method of the invention, an acetic acid removal type room temperature curable organopolysiloxane composition is readily prepared. The composition has improved shelf stability, physical properties, and outer appearance and enhanced adhesion to metallic aluminum. The composition is suitable as sealants for general building use and at joints where movement is allowable and as coating materials required to have a follow-up ability.

EXAMPLES

Examples of the invention are given below by way of illustration and not by way of limitation. All parts are by weight, and the particle size is a mean particle size.

Example 1

In a Shinagawa universal mixer, 60 parts of α,ω-dihydroxydimethylpolysiloxane having a viscosity of 50,000 cs at 25° C. was mixed with 0.1 part of di-t-butyltin dimethoxide. The mixture was then mixed with a curing agent premix of 5 parts of methyltriacetoxysilane and 0.5 part of methanol. This mixture was then mixed with 40 parts of calcium carbonate (particle size 0.08 μm) treated with 5.0% by weight of rosin (based on dihydroabietic acid) having a melting point of about 200° C., and 25 parts of trimethylsilyl end-blocked dimethylpolysiloxane having a viscosity of 100 cs at 25° C. The ingredients were deaerated and mixed, obtaining a room temperature curable organopolysiloxane composition.

Example 2

A room temperature curable organopolysiloxane composition was obtained as in Example 1 except that 40 parts of calcium carbonate (particle size 0.06 μm) treated with 5.0% by weight of $C_{21}H_{43}COOH$ having a melting point of 102° C. was used instead of the calcium carbonate treated with 5.0% by weight of rosin (based on dihydroabietic acid).

Example 3

In a Shinagawa universal mixer, 70 parts of α,ω-dihydroxydimethylpolysiloxane having a viscosity of 50,000 cs at 25° C. was mixed with 0.1 part of di-t-butyltin dimethoxide. The mixture was then mixed with a curing agent premix of 2.5 parts of methyltriacetoxysilane and 0.2 part of methanol. This mixture was mixed with 30 parts of trimethylsilyl end-blocked dimethylpolysiloxane and 10 parts of dry silica which had been surface treated to be hydrophobic (Aerosil R972 by Nippon Aerosil K.K.). The ingredients were deaerated and mixed, obtaining a room temperature curable organopolysiloxane composition.

Example 4

In a Shinagawa universal mixer, 70 parts of α,ω-dihydroxydimethylpolysiloxane having a viscosity of 50,000 cs at 25° C. was mixed with 0.1 part of di-t-butyltin dimethoxide. To this mixture was added 2.5 parts of methyltriacetoxysilane. After 10 minutes of mixing, 0.2 part of methanol was added, Thereafter, 30 parts of trimethylsilyl end-blocked dimethylpolysiloxane was added to the mixture, and 10 parts of dry silica (Aerosil R972 by Nippon Aerosil K.K.) was then added. The ingredients were deaerated and mixed, obtaining a room temperature curable organopolysiloxane composition.

Example 5

In a Shinagawa universal mixer, 70 parts of α,ω-dihydroxydimethylpolysiloxane having a viscosity of 50,000 cs at 25° C. was mixed with 0.1 part of di-t-butyltin dimethoxide. This mixture was then mixed with a curing agent premix of 3.5 parts of methyltriacetoxysilane and 0.3 part of methanol. Thereafter, 30 parts of trimethylsilyl end-blocked dimethylpolysiloxane was added to the mixture, and 9 parts of fresh (untreated) dry silica having a specific surface area of 200 m²/g was then added. The ingredients were deaerated and mixed, obtaining a room temperature curable organopolysiloxane composition.

Example 6

In a Shinagawa universal mixer, 100 parts of α,ω-dihydroxydimethylpolysiloxane having a viscosity of 20,000 cs at 25° C. was mixed with 0.1 part of di-t-butyltin dimethoxide. The mixture was then mixed with a curing agent premix of 2.5 parts of methyltriacetoxysilane and 0.2 part of methanol. This mixture was mixed with 10 parts of dry silica (Aerosil R972 by Nippon Aerosil K.K.). The ingredients were deaerated and mixed, obtaining a room temperature curable organopolysiloxane composition.

Comparative Example 1

In a Shinagawa universal mixer, 60 parts of α,ω-dihydroxydimethylpolysiloxane having a viscosity of 50,000 cs at 25° C. was mixed with 0.1 part of di-t-butyltin dimethoxide. To the mixture was added 5 parts of methyltriacetoxysilane. This mixture was mixed with 40 parts of calcium carbonate (particle size 0.08 μm) treated with 5.0% by weight of rosin (based on dihydroabietic acid) having a melting point of about 200° C., and 25 parts of trimethylsilyl end-blocked dimethylpolysiloxane having a viscosity of 100 cs at 25° C. The ingredients were deaerated and mixed, obtaining a room temperature curable organopolysiloxane composition.

Comparative Example 2

In a Shinagawa universal mixer, 70 parts of α,ω-dihydroxydimethylpolysiloxane having a viscosity of 50,000 cs at 25° C. was mixed with 0.1 part of di-t-butyltin dimethoxide. To this mixture was added 2.5 parts of methyltriacetoxysilane. To the mixture, 30 parts of trimethylsilyl end-blocked dimethylpolysiloxane was then added. Then 10 parts of dry silica (Aerosil R972 by Nippon Aerosil K.K.) was added to the mixture. The ingredients were deaerated and mixed, obtaining a room temperature curable organopolysiloxane composition.

Comparative Example 3

In a Shinagawa universal mixer, 70 parts of α,ω-dihydroxydimethylpolysiloxane having a viscosity of 50,000 cs at 25° C. was mixed with 0.1 part of di-t-butyltin dimethoxide. To this mixture, 4 parts of vinyltriacetoxysilane was added, and 30 parts of trimethylsilyl end-blocked dimethylpolysiloxane was then added. Then 10 parts of dry silica (Aerosil R972 by Nippon Aerosil K.K.) was added to the mixture. The ingredients were deaerated and mixed, obtaining a room temperature curable organopolysiloxane composition.

Comparative Example 4

In a Shinagawa universal mixer, 70 parts of α,ω-dihydroxydimethylpolysiloxane having a viscosity of 50,000 cs at 25° C. was mixed with 0.1 part of di-t-butyltin dimethoxide. To this mixture, 3.5 parts of methyltriacetoxysilane was added, and 30 parts of trimethylsilyl end-blocked dimethylpolysiloxane was then added. Then 9 parts of fresh (untreated) dry silica having a specific surface area of 200 m²/g was added to the mixture. The ingredients were deaerated and mixed, obtaining a room temperature curable organopolysiloxane composition.

Comparative Example 5

In a Shinagawa universal mixer, 70 parts of α,ω-dihydroxydimethylpolysiloxane having a viscosity of 50,000 cs at 25° C. was mixed with 0.1 part of di-t-butyltin dimethoxide. This mixture was mixed with a curing agent premix of 2.5 parts of methyltriacetoxysilane and 0.25 part of ethanol. To the mixture, 30 parts of trimethylsilyl end-blocked dimethylpolysiloxane was added. Then 10 parts of dry silica (Aerosil R972 by Nippon Aerosil K.K.) was added to the mixture. The ingredients were deaerated and mixed, obtaining a room temperature curable organopolysiloxane composition.

Comparative Example 6

In a Shinagawa universal mixer, 70 parts of α,ω-dihydroxydimethylpolysiloxane having a viscosity of 50,000 cs at 25° C. was mixed with 0.1 part of di-t-butyltin dimethoxide. This mixture was mixed with 2.5 parts of a curing agent premix of methyltriacetoxysilane and ethyltriacetoxysilane in a weight ratio of 95:5. To the mixture, 30 parts of trimethylsilyl end-blocked dimethylpolysiloxane was added. Then 10 parts of dry silica (Aerosil R972 by Nippon Aerosil K.K.) was added to the mixture. The ingredients were deaerated and mixed, obtaining a room temperature curable organopolysiloxane composition.

Comparative Example 7

In a Shinagawa universal mixer, 70 parts of α,ω-dihydroxydimethylpolysiloxane having a viscosity of 50,000 cs at 25° C. was mixed with 0.1 part of di-t-butyltin dimethoxide. This mixture was mixed with a premix of 2.5 parts of methyltriacetoxysilane and 2 parts of ethanol. To the mixture, 30 parts of trimethylsilyl end-blocked dimethylpolysiloxane having a viscosity of 100 cs at 25° C. was added. Then 10 parts of dry silica (Aerosil R972 by Nippon Aerosil K.K.) was added to the mixture. Upon deaeration and mixing, the mixture thickened and gelled.

The room temperature curable organopolysiloxane compositions obtained in the foregoing Examples and Comparative Examples were examined by a block H-1 type adhesion test according to JIS A-5758 and a storage stability test. The results are shown in Tables 1 to 3.

Block H-1 Type Adhesion Test

The adherends used were float glass plates and JIS aluminum plates.

In a mold, the room temperature curable organopolysiloxane composition as a sealant was cured to the adherend by holding at a temperature of 20° C. and a relative humidity of 55% for 7 days, and the block was removed from the mold. The block was aged for 7 days under the same conditions as above before it was measured for physical properties, which are designated initial properties.

In a water immersion test, the block was further immersed in water at 50° C. for 28 days before it was measured for physical properties.

In a heating test, the block was further held in a drying oven at 100° C. for 28 days before it was measured for physical properties.

The physical properties measured were tensile strength (Tmax), elongation (Emax) and cohesive failure (CF). Using a tensile tester Strograph R-2 (Toyo Seiki Mfg. K.K.), the tensile strength and elongation of the block were measured at a pulling rate of 50 mm/min. After the tensile test, the rupture section between the adherend and the sealant was visually observed. The percent area of the sealant left on the rupture section was calculated as a measure of cohesive failure.

The compositions obtained in Examples and Comparative Examples and the cured products thereof were held in a drying oven at 150° C. for 7 days, following which their outer appearance was observed.

TABLE 1

| Example | Test conditions Adherend | 20° C./55%/14 days (initial) | | | 20° C./55%/14 days + water immersion 50° C./28 days | | | 20° C./55%/14 days + heating 100° C./28 days | | |
|---|---|---|---|---|---|---|---|---|---|---|
| | | Tmax (kgf/cm$^2$) | Emax (%) | CF (%) | Tmax (kgf/cm$^2$) | Emax (%) | CF (%) | Tmax (kgf/cm$^2$) | Emax (%) | CF (%) |
| 1 | float glass | 13.3 | 324 | 100 | 12.7 | 384 | 100 | 12.6 | 360 | 100 |
| | JIS aluminum | 12.6 | 322 | 100 | 12.2 | 300 | 100 | 11.0 | 378 | 100 |
| 2 | float glass | 14.7 | 344 | 100 | 13.1 | 307 | 100 | 12.9 | 352 | 100 |
| | JIS aluminum | 12.7 | 350 | 100 | 12.5 | 313 | 100 | 12.9 | 323 | 100 |
| 3 | float glass | 9.7 | 220 | 100 | 9.2 | 228 | 100 | 8.9 | 180 | 100 |
| | JIS aluminum | 8.8 | 216 | 100 | 8.2 | 221 | 100 | 8.3 | 191 | 100 |
| 4 | float glass | 8.4 | 180 | 100 | 7.7 | 140 | 95 | 7.8 | 160 | 100 |
| | JIS aluminum | 8.2 | 150 | 100 | 8.1 | 130 | 90 | 7.8 | 140 | 90 |
| 5 | float glass | 10.8 | 300 | 100 | 10.8 | 290 | 100 | 10.8 | 330 | 100 |
| | JIS aluminum | 10.7 | 290 | 100 | 10.5 | 310 | 100 | 10.9 | 340 | 100 |
| 6 | float glass | 10.2 | 110 | 100 | 9.7 | 130 | 100 | 10.1 | 100 | 100 |
| | JIS aluminum | 10.6 | 120 | 100 | 10.1 | 140 | 100 | 10.5 | 105 | 100 |

TABLE 2

| Example | Test conditions Adherend | 20° C./55%/14 days (initial) | | | 20° C./55%/14 days + water immersion 50° C./28 days | | | 20° C./55%/14 days + heating 100° C./28 days | | |
|---|---|---|---|---|---|---|---|---|---|---|
| | | Tmax (kgf/cm$^2$) | Emax (%) | CF (%) | Tmax (kgf/cm$^2$) | Emax (%) | CF (%) | Tmax (kgf/cm$^2$) | Emax (%) | CF (%) |
| 1 | float glass | 12.7 | 353 | 100 | 10.8 | 323 | 90 | 10.1 | 303 | 70 |
| | JIS aluminum | 11.5 | 322 | 40 | peeled | — | — | peeled | — | — |
| 2 | float glass | 9.8 | 153 | 100 | 8.1 | 145 | 100 | 8.9 | 140 | 100 |
| | JIS aluminum | 8.1 | 120 | 90 | peeled | — | — | peeled | — | — |
| 3 | float glass | 9.5 | 110 | 100 | 9.0 | 120 | 70 | 8.9 | 105 | 80 |
| | JIS aluminum | peeled | — | — | peeled | — | — | peeled | — | — |

TABLE 2-continued

| | | 20° C./55%/14 days (initial) | | | 20° C./55%/14 days + water immersion 50° C./28 days | | | 20° C./55%/14 days + heating 100° C./28 days | | |
|---|---|---|---|---|---|---|---|---|---|---|
| Example | Test conditions Adherend | Tmax (kgf/cm²) | Emax (%) | CF (%) | Tmax (kgf/cm²) | Emax (%) | CF (%) | Tmax (kgf/cm²) | Emax (%) | CF (%) |
| 4 | float glass | 11.6 | 260 | 100 | 11.5 | 250 | 90 | 4.6 | 160 | 80 |
| | JIS aluminum | peeled | — | — | peeled | — | — | peeled | — | — |
| 5 | float glass | 9.6 | 110 | 100 | 7.5 | 70 | 70 | 8.2 | 100 | 80 |
| | JIS aluminum | peeled | — | — | peeled | — | — | peeled | — | — |
| 6 | float glass | 9.6 | 130 | 100 | 5.5 | 150 | 90 | 4.6 | 160 | 80 |
| | JIS aluminum | 9.6 | 80 | 70 | peeled | — | — | peeled | — | — |

TABLE 3

| | Discoloration of composition at 150° C., 7 days | Discoloration of cured product at 150° C., 7 days |
|---|---|---|
| E1 | yellow | yellow |
| E2 | no change | no change |
| E3 | no change | no change |
| E4 | no change | no change |
| E5 | no change | no change |
| E6 | no change | no change |
| CE1 | yellow | yellow |
| CE2 | no change | no change |
| CE3 | red | red |
| CE4 | no change | no change |
| CE5 | no change | no change |
| CE6 | red | red |

Japanese Patent Application No. 11-238209 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A room temperature curable organopolysiloxane composition comprising (1) 100 parts by weight of an organopolysiloxane of the following general formula (I):

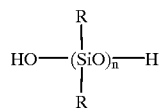

(I)

wherein R is a monovalent hydrocarbon group, and n is such an integer that the organopolysiloxane has a viscosity of about 10 to 1,000,000 centistokes at 25° C., (2) 2 to 10 parts by weight of methyltriacetoxysilane or a partial hydrolyzate thereof, and (3) 0.01 to 0.5 part by weight of methanol per part by weight of component (2).

2. The composition of claim 1 wherein a premix of components (2) and (3) is blended with component (1).

3. The composition of claim 1 further comprising an inorganic filler.

4. The composition of claim 3 wherein the inorganic filler is silica or calcium carbonate.

5. The composition of claim 1 further comprising a curing catalyst.

6. A method for preparing the room temperature curable organopolysiloxane composition of claim 1 comprising the steps of:

premixing components (2) and (3), and mixing the premix with component (1).

7. The method of claim 6 further comprising the step of premixing a curing catalyst with component (1).

* * * * *